Patented Sept. 4, 1934

1,972,219

UNITED STATES PATENT OFFICE 1,972,219

AROMATIC CYANO-ACETYL COMPOUND AND PROCESS OF PREPARING IT

Wilhelm Eckert, Heinrich Sieber, and Heinrich Greune, Frankfort-on-the-Main-Hochst, Germany, assignors to General Aniline Works, Inc., New York, N. Y., a corporation of Delaware No Drawing. Application August 27, 1930, Serial No. 478,310. In Germany September 25, 1929

10 Claims. (Cl. 260—99.30)

The present invention relates to aromatic cyano-acetyl compounds and process of preparing them.

We have found that by the action of cyano-acetyl chloride upon an aromatic compound in the presence of an acid condensing agent, such as aluminiumchloride, new substitution products of the following general formula

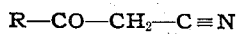

R—CO—CH$_2$—C≡N wherein R stands for an aromatic group, are obtained. The condensation preferably is carried out in the presence of an inert diluent, such, for instance, as carbon disulfide, acetylene tetrachloride and the like, at temperatures up to 60° C. It is also possible to use the aromatic compound itself as a diluent.

It was rather surprising that the said reaction occurred inasmuch as the cyano-acetyl chloride is a very unstable body. According to literature (Mulder Bull. Soc. Chim. (2) 29, 533) it is not even certain that by causing phosphorus pentachloride to act upon cyano-acetic acid the corresponding acid chloride is formed at all. At least it is impossible according to Mulder to distil the acid chloride even in a vacuum. In view of this instability of the cyano-acetyl-chloride it could not be expected that the latter would yield by condensation with hydrocarbon well-defined compounds without decomposing. The condensation can be applied to all aromatic hydrocarbons such, for instance, as those of the benzene, naphthalene, acenaphthalene or anthracene series. The products are valuable intermediate-products for the manufacture of dyestuffs.

The following examples serve to illustrate the invention, but they are not intended to limit it thereto; the parts are by weight:

(1) 150 parts of acenaphthene are dissolved in 1000 parts by volume of dry carbon disulfide and 114 parts of cyano-acetylchloride are added thereto, 140 parts of aluminium chloride are gradually introduced into the mixture while cooling. After the mass has been allowed to remain for 12 hours at room-temperature it is heated to 40° C. for half an hour and then worked up as usual. The 5-cyanacetyl-acenaphthene of the following formula

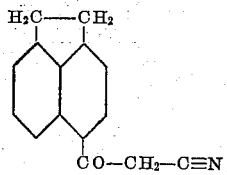

thus obtained can be re-crystallized from alcohol in the form of prisms. It dissolves in concentrated sulfuric acid to a red solution and melts at about 163° C. The cyano-acetyl chloride as such need not be isolated, it can be used directly for the condensation in the solvent in which it is prepared from cyano-acetic acid by means of, for instance, phosphorus pentachloride.

(2) 100 parts of acenaphthene are dissolved in 700 parts by volume of acetylene-tetrachloride and 104 parts of cyano-acetyl chloride are added thereto. At 40° C. to 45° C. 120 parts of anhydrous aluminium chloride are gradually introduced and subsequently the mass is kept at this temperature for about 1 hour. When the reaction is finished, ice and diluted hydrochloric acid are added and the acetylene-tetrachloride is distilled by means of steam. The new acenaphthene derivative is filtered by suction, washed until neutral and dried. Its properties are identical with those of the product obtained according to Example 1. After re-crystallization from alcohol it melts at 163° C. It dissolves in concentrated sulfuric acid to a red solution.

(3) 92 parts of toluene are mixed with 150 parts of cyano-acetylchloride and 1000 parts by volume of carbon disulfide are added thereto. 200 parts of aluminium chloride are gradually introduced at 30° C.–40° C. and this temperature is maintained until the evolution of hydrochloric acid is finished. The mass is decomposed with ice and the carbon disulfide is distilled by means of steam. The remaining oil solidifies on cooling into long felted white needles. After re-crystallization from petroleum ether, the product melts at 104° C.

(4) 200 parts of aluminium chloride are introduced in small portions at 30° C. into a mixture of 142 parts of α-methyl-naphthalene, 150 parts of cyano-acetylchloride and 1000 parts by volume of carbon disulfide. The temperature is raised to 40° C. and maintained until the reaction is complete. The product is worked up as in Example 3. The cyano-acetyl-α-methylnaphthalene obtained which corresponds with one of the following formulæ:

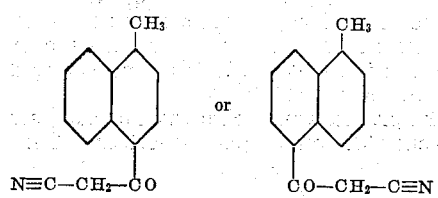

crystallizes from petroleum ether in white, clustered needles and melts at 127° C.

(5) 19 parts of 3-chloro-acenaphthene are dissolved in 150 parts by volume of carbon disulfide. 15 parts of cyano-acetylchloride are added and 20 parts of aluminium chloride are gradually introduced at 30° C.–40° C. After the reaction is complete the carbon disulfide is poured off and the residue is decomposed with ice. The crude 3-chloro-cyano-acetylacenaphthene of one of the following formulæ:

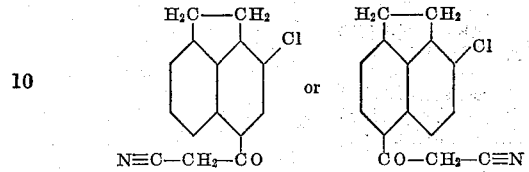

is filtered with suction, washed until neutral and dried. It crystallizes from glacial acetic acid in the form of needles and melts at 69° C. It dissolves in concentrated sulfuric acid to a red solution.

(6) 75 parts of cyano-acetylchloride are suspended in 500 parts of benzene, and 100 parts of aluminium chloride are gradually introduced into this suspension at a temperature of 30° C. The temperature is raised to 40° C. and the mixture is stirred until the evolution of hydrochloric acid is finished. After cooling the mass is mixed with ice and unaltered benzene is distilled with steam. On cooling, the cyano-acetyl-benzene of the following formula

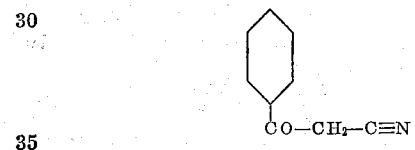

is obtained in a crystalline form. It crystallizes from petroleum ether in the form of white felted needles and melts at about 80° C.

We claim:

1. The process which comprises causing cyano-acetyl-chloride to act upon an aromatic compound in the presence of an inert diluent and an acid condensing agent at a temperature up to 60° C.

2. The process which comprises causing cyano-acetyl-chloride to act upon an aromatic compound of the group consisting of benzene, naphthalene and acenaphthene series in the presence of an inert diluent and aluminium chloride at a temperature up to 60° C.

3. The process which comprises causing cyano-acetyl-chloride to act upon a compound of the following formula

wherein X stands for hydrogen or chlorine, in the presence of an inert diluent and aluminium chloride at a temperature up to 60° C.

4. The process which comprises causing cyano-acetyl-chloride to act upon acenaphthene in the presence of carbon-disulfide and aluminium chloride at about 40° C.

5. The process which comprises causing cyano-acetyl-chloride to act upon α-methylnaphthalene in the presence of carbon-disulfide and aluminium chloride at about 40° C.

6. The process which comprises causing cyano-acetyl-chloride to act upon toluene in the presence of carbon-disulfide and aluminium chloride at about 30° C.–40° C.

7. 5-cyanacetyl-acenaphthene of the following formula

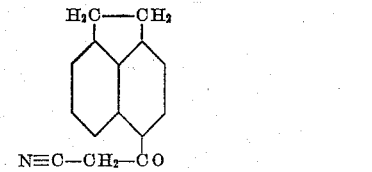

crystallizing from alcohol in the form of prisms, melting at 163° C. and dissolving in concentrated sulfuric acid to a red solution.

8. The compound of the following formula

wherein one of the Y's stands for hydrogen, the other Y for the residue

—CO—CH$_2$—C≡N, crystallizing from petroleum ether in white clustered needles melting at 127° C.

9. The compounds substantially identical with those which are obtainable by causing cyano-acetyl chloride to act upon a compound of the following general formula:

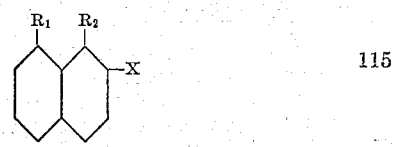

wherein R$_1$ represents hydrogen, R$_2$ represents methyl and X represents hydrogen or R$_1$ and R$_2$ jointly represent the group —CH$_2$—CH$_2$—forming thus part of a five-membered ring and wherein X represents hydrogen or chlorine in the presence of an inert diluent and aluminium chloride at a temperature up to 60° C.

10. The compounds substantially identical with those which are obtainable by causing cyano-acetyl-chloride to act upon a compound of the following formula:

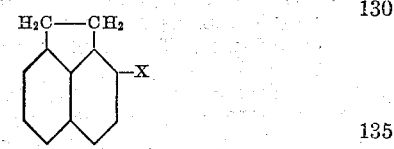

wherein X stands for hydrogen or chlorine, in the presence of an inert diluent and aluminium chloride at a temperature up to 60° C.

WILHELM ECKERT.
HEINRICH SIEBER.
HEINRICH GREUNE.